US000001036H

United States Statutory Invention Registration [19]

[11] Reg. Number: H1036

[43] Published: Apr. 7, 1992

Fisher

[54] WINDSHIELD WIPER BOOT

[76] Inventor: Brian A. Fisher, 536 Mathewman Crescent, Burlington, Ontario, Canada, L7L 5S6

[21] Appl. No.: 545,673

[22] Filed: Jun. 29, 1990

Related U.S. Application Data

[63] Continuation of Ser. No. 299,365, Jan. 23, 1989, abandoned.

[30] Foreign Application Priority Data

Jan. 21, 1988 [CA] Canada ..... 557093

[51] Int. Cl.[5] ..... B60S 1/04; B60S 1/38

[52] U.S. Cl. ..... 15/250.42; 15/250.36

[58] Field of Search ..... 15/250.36–250.42

[56] References Cited

U.S. PATENT DOCUMENTS

| | | | |
|---|---|---|---|
| 2,727,271 | 12/1955 | Oishei et al. | 15/250.42 |
| 2,728,100 | 12/1955 | Oishei | 15/250.42 |
| 3,619,556 | 11/1971 | Deibel | 15/250.42 |
| 3,644,957 | 2/1972 | Deibel et al. | 15/250.42 |
| 4,166,833 | 9/1979 | Schurmann | 264/536 |
| 4,360,941 | 11/1982 | Mobie | 15/250.42 |
| 4,445,406 | 5/1984 | Thatcher | 264/536 |
| 4,683,606 | 8/1987 | Sharp | 15/250.42 |

FOREIGN PATENT DOCUMENTS

| | | | |
|---|---|---|---|
| 2517489 | 10/1976 | Fed. Rep. of Germany | 15/250.42 |
| 2144976 | 3/1985 | United Kingdom | 15/250.42 |

*Primary Examiner*—Bernarr E. Gregory

[57] ABSTRACT

A windshield wiper boot made by blow moulding a thermoplastic elastomer. The selected thermoplastic elastomer advantageously does not absorb moisture and will not stick to itself, thereby obviating the need for a release agent wash. The blow moulding process results in a boot of superior finish and permits the boot to be formed with a thickened saddle area where it is fastened to a windshield wiper superstructure for connection to a wiper arm and also to carry identifying logos and the like.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG.1-PRIOR ART

WINDSHIELD WIPER BOOT

This application is a continuation of application Ser. No. 07/299,365, filed Jan. 23, 1989, now abandoned.

This invention relates to what is commonly referred to in the industry as a windshield wiper boot for use in covering the superstructure of a windshield wiper so as to keep out from the joints any foreign matter such as snow, ice or dirt.

Conventionally, windshield wiper boots consist of a longitudinal, seamless, tubular envelope conforming to the shape of a wiper and open at both ends for stretching and sliding over a wiper superstructure to be contained in the boot. Such boots are predominantly made of a latex dipped neoprene material using a relatively costly process known as dip moulding.

The latex material can be stretched to facilitate its installation on the wiper blade and, because of the nature of the manufacturing process, the wiper boot has a uniform wall thickness. The chosen thickness is a compromise between a need for strength at the centre where fasteners associated with the superstructure pass through openings in the boot, and a preference for a light, thin covering in other parts of the boot.

Although latex has been accepted as the material of preference for boots in the past, it has some disadvantageous features. The material absorbs moisture and tends to "swell". If the boot is exposed to water over a prolonged and continuous period, for example, to a two or three hour rainstorm, it may absorb up to 50% of its weight in water and double or even triple its volume. The boot then sags and touches the windshield, resulting in poor wipe quality. The absorption of moisture can be particularly detrimental in severe climates where the wind chill temperature outside a vehicle may be well below the freezing point.

Also, the material can not be recovered for reuse should the process of manufacturing the boot fail for some reason. Moreover, dip moulded latex boots are prone to surface defects and the manufacturing process requires that vigorous quality control measures by employed to ensure that the boots have a satisfactory appearance. One common type of surface defect is known as a "run" and is identified by a wavy pattern formed on the boot during dipping. Another defect is identified by surface lumps which give the boot a pitted appearance and which are formed by pre-cured lumps in the latex dip.

It will be understood that latex has a variable consistency which becomes firmer with aging. Thus, to avert the formation of the abovementioned surface defects, it is necessary to have an ample stock of green material and adequate facilities to age the latex, on average, over a six week period. Any changes in material supply, control, and demand are likely to result in the formation of surface defects in the boot. In extreme circumstances, the defects may extend through the thickness of the moulded material and the final boot product will have to be discarded entirely.

Still a further disadvantage of latex dipped boots is that adjacent latex surfaces tend to adhere to one another so that boots will cling together during shipping and storage if they are not treated with a release agent subsequent to moulding.

An object of the present invention is to provide a windshield wiper boot which retains the advantages of latex dipped boots and which will provide additional advantages.

In accordance with this invention there is provided a windshield wiper assembly comprising a wiper superstructure and a blow-moulded boot comprising an elongate substantially tubular envelope made of thermoplastic elastomeric material covering the superstructure and adapted to shield the superstructure from weathering elements. The boot has a channel extending along the length thereof and is received in a retaining groove formed in the superstructure. A squeegee is slidably received in the channel and a fitting is attached to a central portion of the superstructure by fasteners which penetrate the boot in a thickened portion thereof, the fitting being adapted for attachment of a wiper arm to the superstructure.

Preferably, the thermoplastic elastomer is selected from the group comprising: ALCRYN 6331 (trade mark of Dupont), SANTOPRENE, and GEOLAST (trade marks of Monsanto).

These and other aspects of the invention will be better understood with reference to the accompanying drawings and the following description of embodiments of a boot made according to the invention and to a preferred method of making the boot.

FIG. 1 is a perspective view illustrating a wiper superstructure and squeegee assembly covered by a latex dipped boot (prior art);

Figure 6:
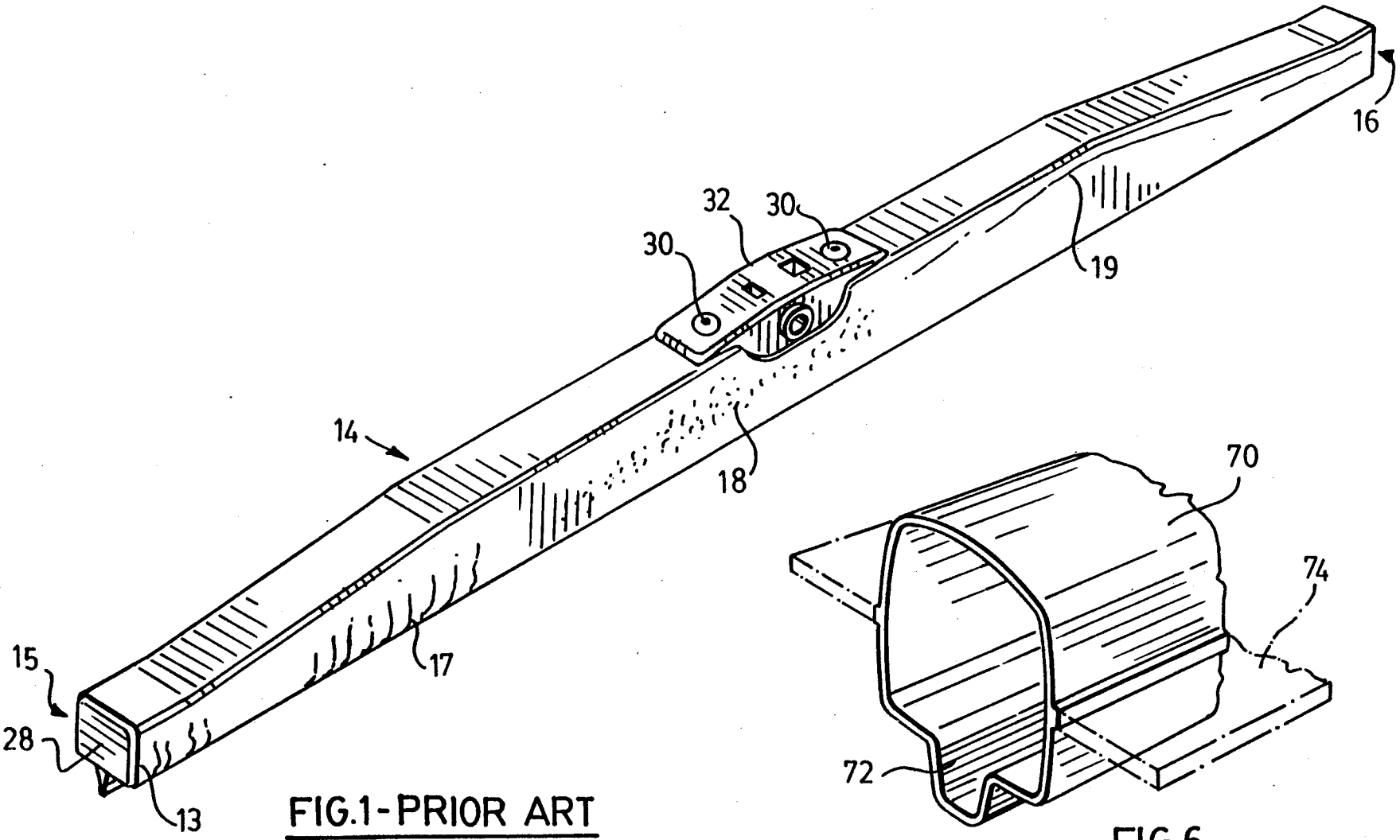
FIG. 6 (drawn adjacent FIG. 1) is a similar view to FIG. 5 illustrating an alternative embodiment of a boot according to the invention.

Referring firstly to FIG. 1, there is illustrated a booted windshield wiper indicated generally by the numeral 14. A boot 13 consists of a longitudinal envelope open at both ends 15, 16 and conforming generally to the external shape of a wiper superstructure 28 which is inserted in and shielded by the boot. The ends of the superstructure are closed to combine with the boot to seal the assembly.

As is conventional in structures of this kind, the boot is attached to the superstructure by fasteners 30 (typically rivets) which pass through a fitting 32 and through the boot to terminate in the main yoke of the superstructure (not shown). The fitting 32 provides for attachment of a wiper arm in conventional fashion.

A number of surface defects are present on the sides of the boot 13 which is latex dipped according to a prior art method of fabrication. These defects include a wavy pattern of runs 17, pitting 18, and a co-axial streak 19. It will of course be appreciated that such defects detract from the appearance of the product and make it commercially undesirable.

Figures 2, 3:
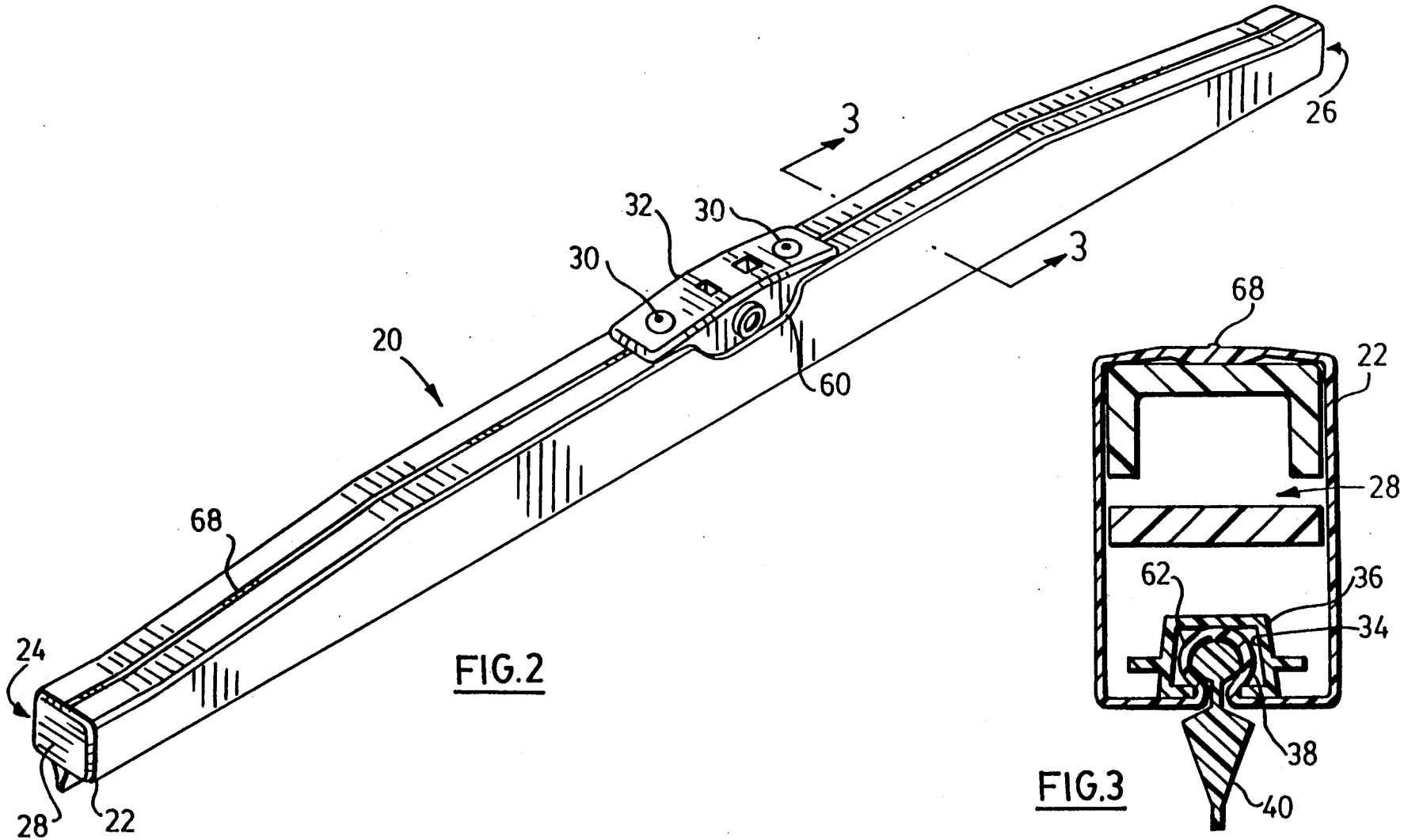
FIG. 2 is a similar view to FIG. 1 illustrating a wiper superstructure and squeegee assembly covered by a blow moulded boot made according to the invention.
FIG. 3 is a cross-sectional view taken on line 3—3 of FIG. 2 and drawn to a larger scale to illustrate the arrangement of the squeegee in the assembly.

In FIG. 2, there is illustrated a booted windshield wiper indicated generally by the numeral 20 and having a boot 22 made by blow moulding according to the invention. In the drawing, the parts of the wiper 20 common to the parts of the wiper in FIG. 1 are numbered with like numerals. Similarly to the latex dipped boot 14, the blow-moulded boot 22 consists of a longitudinal envelope open at both ends 24, 26, and conforming generally to the external shape of the wiper superstructure 28. A notable difference between the boots is their external appearance which in the case of the blow-moulded boot 22, is free from defects and smooth except for beads 68 and 62 (not shown) more fully described in the following description, in particular, with reference to FIGS. 4 and 5.

Reference is next made to FIG. 3 which shows a typical cross-section of the assembly. A retaining groove 34 is provided in an elongate receptacle 36 forming part of the superstructure, and the boot has a complementary inwardly directed channel portion 38 in the receptable and extending about a squeegee 40 slidably retained in the assembly.

Figures 4, 5:
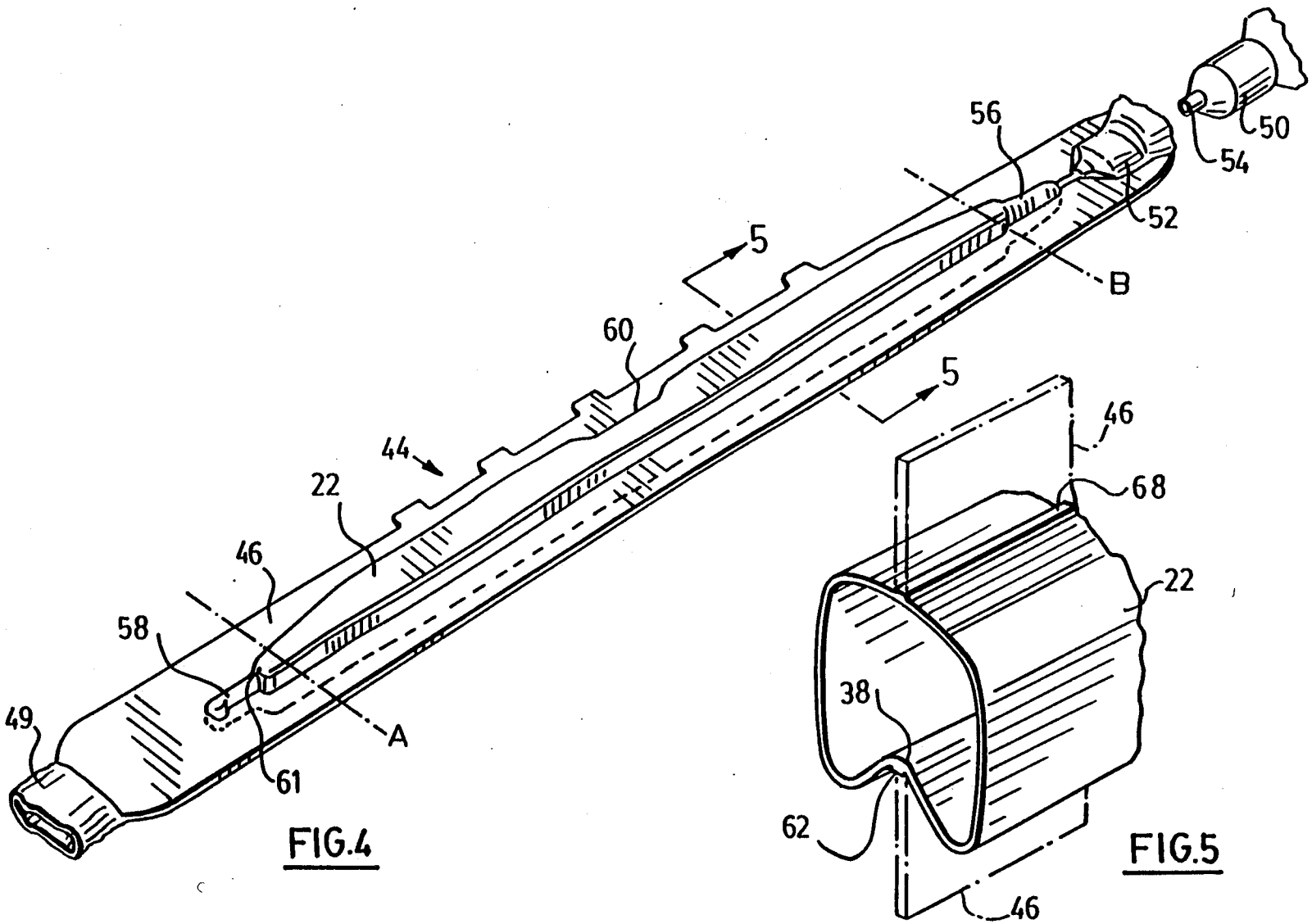
FIG. 4 is a perspective view of a blank for making the boot and showing the boot after moulding and prior to trimming.
FIG. 5 is a perspective sectional view taken on line 5—5 of FIG. 4 and drawn to a larger scale with the flash in ghost outline to show a channel portion for receiving the squeegee.

Before describing the boot 22 in further detail, the method of making the boot will be described with reference to FIGS. 4 and 5. Firstly, a tubular parison is extruded continuously from a thermoplastic elastomer such as ALCRYN 6331 (trade mark of Dupont) or SANTOPRENE or GEOLAST (trade marks of Monsanto) and fed into a blow moulding machine. The parison is preferably formed with a small positive pressure of about 2 psi to have a wall thickness which is at a maximum where the parison is to become the longitudinal centre of the boot and thinner at the portions corresponding to the ends of the boot. A portion of the parison is shown in FIG. 4 after severing and blow moulding to form a blank 44 from which the boot is trimmed. This Figure also serves to demonstrate the manufacturing process.

The blank 44 consists essentially of a peripheral flash 46 surrounding the boot 22. It can be seen from a severed end 49 of the blank that it has been formed from a continuous tubular parison which is fed from the left as drawn in FIG. 4 into a two-part mould and entered over an injection head 50 from which it has been removed in FIG. 4. It will be clear that the injection head 50 causes the blank to have the shape shown at 52 and that a blow pin 54 will provide access in the mould to pressurize the space within the boot 22, optionally with heated air, and cause it to take the shape of the mould. Preferably this takes place in two blowing stages, the first stage being at a low pressure to preform the boot and the second stage being at a high pressure to stretch the preformed moulding and give the boot better definition and an improved surface finish. Portions 56, 58 of excess material are provided at the ends of the boot to improve the flow of material at the ends and these portions will be cut off at the lines indicated by the letters "A" and "B". This will give the ends 24, 26 shown in FIG. 2.

The mould is heated to bring the thermoplastic elastomer material above the temperature at which plastic deformation will occur without melting it. Also in order to vary the thickness of the finished boot locally, the mould is cooled in the region of the desired thickness. For instance, the region corresponding to a saddle portion 60 is cooled to restrict the flow of material here. This retains some of the thickened portion of the parison so that the resulting boot will have sufficient thickness in this region of the saddle to strengthen the boot.

After formation as shown in FIG. 4, the blank 44 is cooled below its plastic transition temperature, vented at a vent hole 61 and the mould halves are separated. The boot 22 is then stripped from the blow pin 54 and moved to a cooling station. To increase production in an automated manufacturing process, the mould clamps may be rotated on a carousel or shuttered between a clamping station and a blowing station.

After cooling, the flash 46 is pulled from the blank 44 to trim the boot 22. FIG. 5 represents the finished cross-section and shows the flash 46 to be removed. In an automated system, it will be clear that tooling will be required to hold the boot in position for removing the flash and this may include tooling which holds the boot in a deformed position to expose the flash shown at the bottom of FIG. 5 so that it can be pulled to leave only a small bead 62 on the outside of the boot. On the upper side of the boot, the flash is similarly removed to leave a small bead 68.

The parison may have a variable wall thickness as previously mentioned. This is achieved by controlling the rate of feed of thermoplastic elastomer material in the charge to form the parison. Without restricting the flexibility of the thermoplastic elastomer material, the thickness of the boot may be increased to a mean thickness of 0.018 inches in the centre or saddle portion 60 of the boot from a mean thickness of 0.009 inches in the remaining portions of the boot.

The material used is preferably ALCRYN 6331 because it absorbs very little water (max. 0.5% by weight) and because of its superior weathering properties and also because these properties can be maintained in a wide range of temperatures, typically from −40 degrees C to well above normal ambient temperatures. Also, because it is elastic, it can be stretched during installation over a wide superstructure and will resume its moulded shape when released. A further important consideration is that because the material is thermoplastic, it can be recycled and consequently all of the waste, flash and unacceptable product can be recycled and used again. This of course enhances the economic desirability of the process.

Finally, a particular advantage in manufacture over the previous method is that the blow moulding process produces a product with excellent surface qualities and can permit identification logos or names to be added to the finished boot simply by having these identifiers in the mould. Still a further advantage is that thermoplastic elastomer surfaces do not adhere to one another thereby obviating the need to wash the boot in a release agent prior to packing and shipping.

It will be understood that several variations may be made to the above described embodiment of the invention. In particular, the shape and configuration of the mould may be altered to facilitate the formation of the inwardly directed channel portion of the boot. Whereas in use, the channel portion is inwardly directed toward the receptable 36 to receive the squeegee 40, a boot 70 may be moulded with an outwardly directed trough 72 which is simply deformed by pushing inwardly after moulding (FIG. 6). If this mould configuration is adopted then the parting line between the moulds will preferably be located to produce a laterally extending flash 74 separating an upper portion of the boot from a lower portion such that the trough 70 does not have the bead.

I claim:

1. A windshield wiper assembly comprising:

a wiper superstructure;

a blow-moulded boot comprising an elongate substantially tubular envelope made of thermoplastic elastomer material covering the superstructure and adapted to shield the superstructure from weathering elements, the boot having a channel extending along the length thereof and being received in a retaining groove formed in the superstructure;

a squeegee slidably received in the channel; and a fitting attached to a central portion of the superstructure by fasteners which penetrate the boot in a thickened portion thereof, the fitting being adapted for attachment of a wiper arm to the superstructure.

* * * * *